United States Patent [19]

Brown

[11] 4,091,584
[45] May 30, 1978

[54] SMALL BUILDING STRUCTURE

[76] Inventor: Ralph E. Brown, 1421 NW. 40th Ter., Gainesville, Fla. 32605

[21] Appl. No.: 766,936

[22] Filed: Feb. 9, 1977

[51] Int. Cl.² ........................... E04B 1/32; E04B 1/12
[52] U.S. Cl. .......................................... 52/86; 47/17; 52/63; 135/1 R; 135/3 R
[58] Field of Search .................... 52/63, 86; 135/1 R, 135/3 R, DIG. 1; 47/17

[56] References Cited

U.S. PATENT DOCUMENTS

| | | | |
|---|---|---|---|
| 2,182,283 | 12/1939 | Curtis | 135/DIG. 1 |
| 2,471,675 | 5/1949 | DeTongh | 52/86 |
| 3,051,185 | 8/1962 | Reynolds | 135/3 R |
| 3,798,851 | 3/1974 | Utahara | 52/86 |
| 3,892,094 | 7/1975 | Spray | 52/86 |

Primary Examiner—Ernest R. Purser
Assistant Examiner—Henry Raduazo
Attorney, Agent, or Firm—LoPucki & LoPucki

[57] ABSTRACT

A skeletal building frame and buildings configured therefrom that can be assembled and disassembled by unskilled personnel with a minimum of tools and connectors. A preferred embodiment is a module fabricated from lightweight, low cost polyvinyl tubing consisting of a rectangular base connected at its corners by elbows, a ridgepole supported by vertical members connected to the base end members, and a plurality of arcuate ribs formed by passing straight tubes through lateral openings in the ridgepole, bending the ends of the tubes downward and inserting in vertically disposed openings in the side members of the base. The tensions created from the bending of the straight tubes are utilized to maintain the integrity of the skeletal frame. The frame may be covered with translucent plastic film or fiberglass panels and utilized as a greenhouse, storage shelter, garage and the like. The frame may be fabricated in a variety of sizes and extended by joining two or more modules.

8 Claims, 9 Drawing Figures

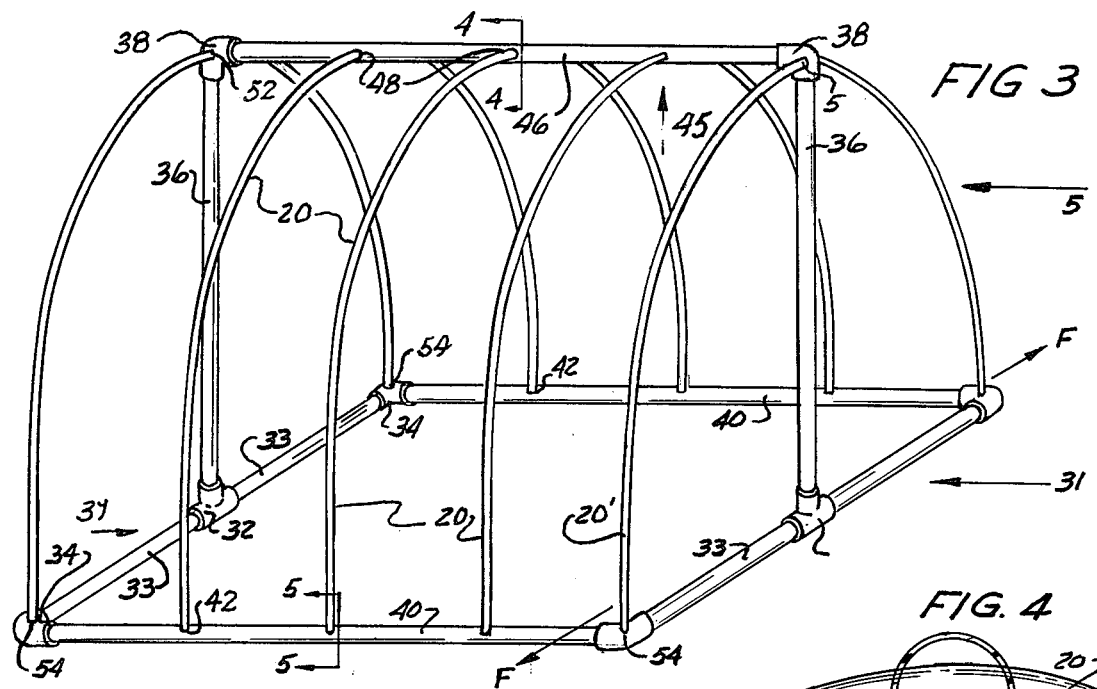
FIG 3
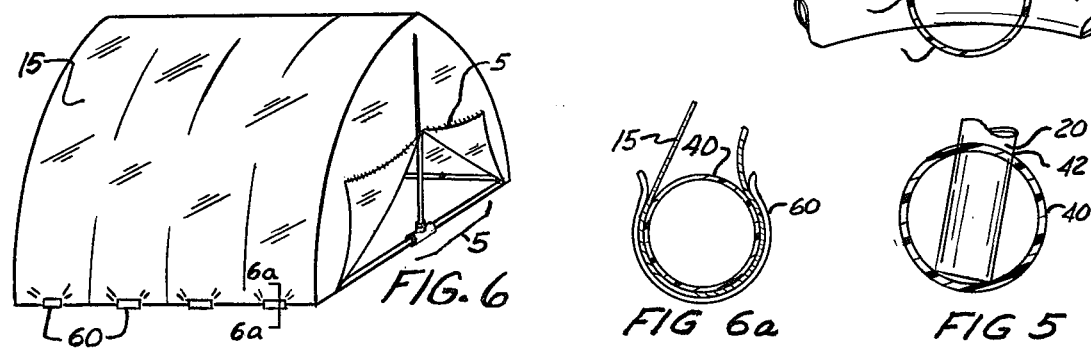
FIG. 4
FIG. 6
FIG 6a
FIG 5
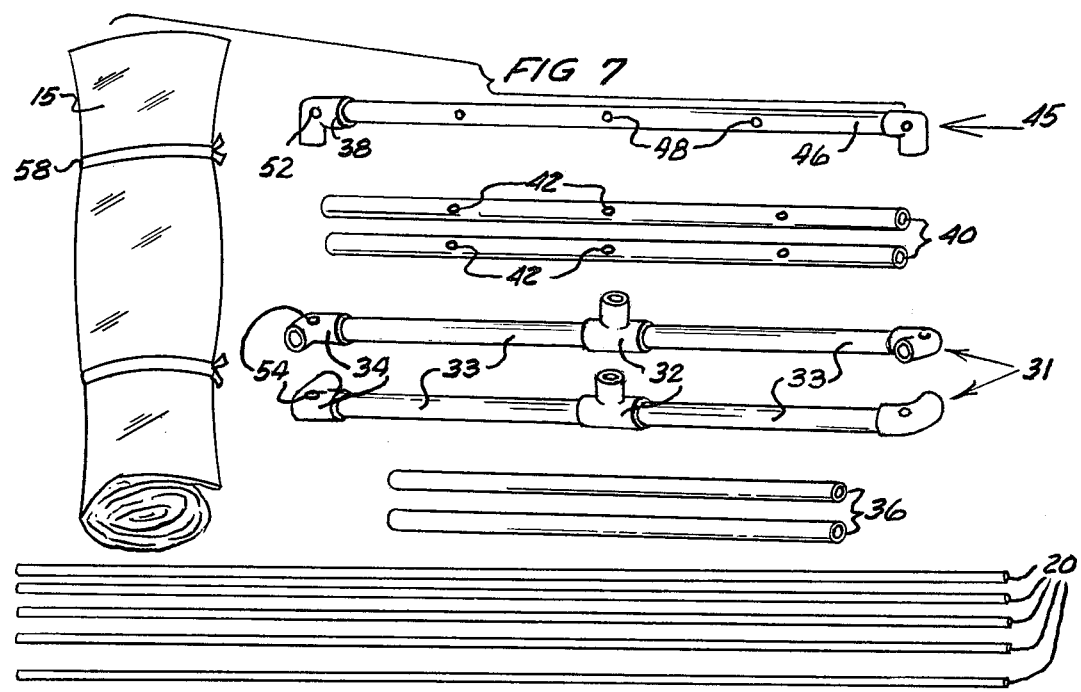
FIG 7

SMALL BUILDING STRUCTURE

BACKGROUND OF THE INVENTION

1. Field of the Invention

This invention relates generally to skeletal frame building structures and more particularly to a simple framework for greenhouses, cold frames, storage sheds and the like formed from interlocking tubular elements.

2. Description of the Prior Art

It is common in the prior art to construct small greenhouses, cold frames for protecting plants, and similar structures in an extended arcuate configuration using pipes or tubes as skeletal frame elements. Known structures, for example as disclosed in U.S. Pat. Nos. 3,798,851, 3,892,094, and 3,987,622, have required complicated and expensive fittings for joining the structural elements which require skilled workmen for assembly. Additionally, such structures are designed for permanent installations.

Commonly available shelters are too complex and expensive for the homeowner and the small gardener. There exists a need for a simple, low-cost shelter that can be assembled quickly by an unskilled person without tools that does not require footings or foundations, and that can be easily disassembled and moved. Applications of such shelters include: small greenhouses; utility storage shelters; vehicle garages; swimming pool covers; sun shades; and temporary warehouses.

SUMMARY OF THE INVENTION

The present invention is a skeletal frame for an arcuate structure formed from light, low cost tubing of light metal or plastic which can be quickly and easily assembled without tools and which requires no separate connectors. The frame may be covered with plastic film, fiberglass panels, or similar material depending on the specific application. The structure can be configured in various sizes and is easily expandable as required.

A rectangular base frame is formed by joining two large diameter end tubes and two medium diameter side tubes. A vertical medium size tube is disposed at the center or each base end tube and a large diameter tube installed between the upper ends of the vertical tubes to form a ridgepole. A set of small diameter rib tubes are passed through a set of spaced lateral horizontal openings through the ridgepole and the tubes bent downward with the ends thereof inserted in vertically disposed openings in the side tubes. Advantageously, the downward bend of the rib tubes results in formation of arcuate ribs and the tension created in bending the ribs is utilized to maintain the structure rigid with no permanent fastening required.

The ends of all tubes are interlocked so that the completed structure is secure and rigid, yet can be quickly disassembled when the occasion requires. The frame can be covered with plastic film, sheeting, or other suitable materials. By selecting the lengths of the various tube elements and the number of rib elements, the size of the shelter may be controlled.

It is therefore a primary object of the invention to provide a low cost skeletal shelter frame suitable for a greenhouse or the like.

It is a further object of the invention to provide a skeletal shelter frame that can be quickly assembled by an unskilled person without tools.

It is a still further object of one version of the invention to provide a skeletal shelter frame that requires no separate connectors for assembly.

It is yet a further object of the invention to provide a skeletal shelter frame that can be quickly disassembled for portability purposes.

It is another object of the invention to provide a shelter frame that can be fabricated in a wide range of sizes.

It is yet another object of the invention to provide a shelter frame that is maintained in a rigid shape by tension in its rib members.

It is still another object of the invention to provide a shelter frame that may be erected without footings or foundations.

Additional objects and advantages of the present invention will become apparent by reference to the following detailed descriptions in conjunction with the accompanying drawings.

BRIEF DESCRIPTION OF THE DRAWINGS

FIG. 3 is a perspective view of an alternative embodiment of the basic module utilizing elbows and tees for joint connections, FIG. 4 is a section through 4—4 of FIG. 3 showing frame ribs passing through the ridgepole, FIG. 5 is a section through 5—5 of FIG. 3 showing the insertion of the frame rib ends into the base side members, FIG. 6 is a perspective view of a typical plastic sheet covering for the skeletal frame of FIG. 3, FIG. 6a is a section through a base member of the shelter of FIG. 6 showing a clip for securing the covering to the frame, FIG. 7 illustrates the shelter of FIG. 6 disassembled for storage or transportation.

DETAILED DESCRIPTION OF THE PREFERRED EMBODIMENTS

Figure 1:
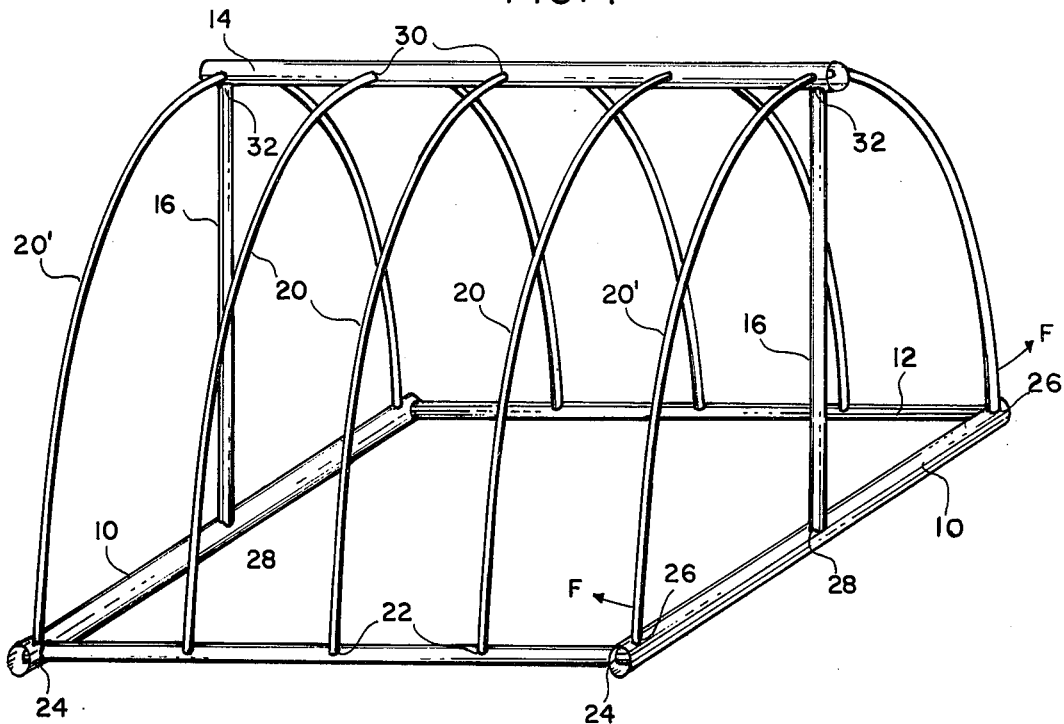
FIG. 1 is a perspective view of a basic module of the skeletal building frame.

The novel skeletal frame type building structure can be fabricated in a wide range of sizes to suit the required application. FIG. 1 illustrates a configuration of the frame that embodies the principal elements of the invention. All elements of the frame are formed from tubing with this embodiment utilizing three diameters of tubing. While tubing of various materials may be used, the preferred material is polyvinyl chloride (PVC) commonly available for plumbing piping. The advantages of PVC include its low cost, light weight, ease of cutting and drilling, appropriate rigidity, and wide availability.

The frame comprises a rectangular base formed from two end members 10 and two side members 12. End member 10 may be 2½ inches in diameter and side member 12 may be 1½ inches in diameter. The end members 10 and side members 12 are joined by inserting the ends of side members 12 in openings 24 at each end of each end member. A ridge pole 14 which may be 2½ inches in diameter is supported at each end by vertical support members 16 which may be 1½ inches in diameter. Vertical members 16 are inserted in vertically disposed openings 28 centrally located in end members 10. Ridge pole 14 has a downwardly disposed opening 32 at each end for receiving the upper ends of support members 16.

Figure 2:
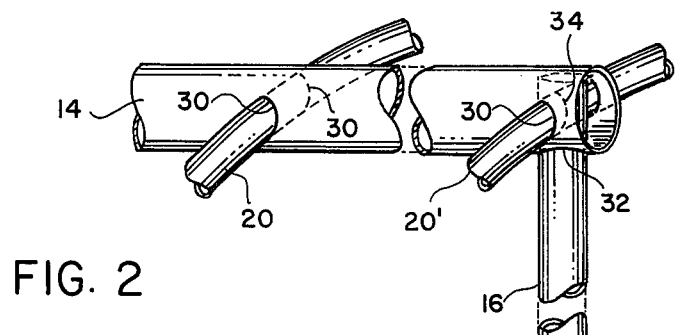
FIG. 2 is a fragmentary view of a typical joint connection of the basic module of FIG. 1.
Figure 2:
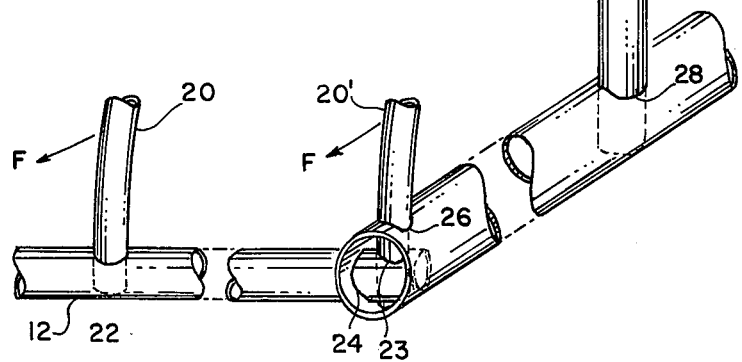

A plurality or ribs are formed by rib members 20. In the illustrated module, a total of five ribs is provided; however it is evident that the number may be varied depending on the length of module required. Rib members 20 for the example may be formed from 1 inch diameter tubing. Ridge pole 14 has a series of horizontally disposed openings 30 through both sides as best seen in FIG. 2. In the assembly of the frame a straight tube of the required length is inserted through each of the openings 30 and approximately centered. The ends of each tube are bent downward and inserted in corresponding vertically disposed openings 22 in side members 12, forming a rib 20. The end ribs 20' also pass through vertically disposed openings 26 in each end of end member 10 advantageously interlocking to maintain the base frame in its rectangular form. Bending of the tubing to form arcuate ribs 20 creates a tension in the ribs with force F as indicated by the arrows. The force from the plurality of ribs 20 advantageously reacts to make the skeletal frame structure self-aligning and rigidly configured. Vertical support members 16, in addition to supporting ridge pole 14, serve to resist any lateral movement of the ridge pole.

The manner in which the various tubular members interlock is more clearly shown in the fragmentary view of FIG. 2. A base frame corner is illustrated with 2½ inch diameter front end member 10 having a rearwardly disposed opening 24 for receiving 1½ inch diameter side member 12. The forward projecting end of side member 12 has a vertically disposed opening 23 which aligns with vertically disposed opening 26 in end member 10. Openings 26 and 23 are sized to receive the end of 1 inch diameter end rib 20'. As may be noted, opening 23 passes completely through side member 12. Insertion of the end of rib end 20' through opening 26 and through opening 23 securely locks the frame corner with force F maintaining tension on the joint. The interior ribs 20 are inserted in openings 22 in side member 12 as shown; however, opening 22 is through only the top surface of member 12.

The front ridge pole joint is also shown in FIG. 2 in which lateral opening 30 passes completely through the forward end of the ridge pole 14 and is aligned with lateral opening 34 (shown in phantom view) through the upper end of front support member 16. Member 16 passes through downwardly disposed opening 32 in ridge pole 14. Insertion of vertical member 16 into opening 32 and insertion of front rib 20' through openings 30 and 34 securely interlock the three members at the ridge pole joint. The lower end of vertical member 16 is inserted in vertically disposed opening 28 in front end member 10. As the ends of front rib 20' are bent downward and inserted through openings 26 and 23, the tension in front rib 20' and the interlocking of the tubes at the base frame corner maintain vertical member in position in opening 28.

As may now be recognized, a simple, light-weight, low-cost skeletal frame structure is provided by the present invention that can be quickly assembled without tools, and that is self-locking and held in rigid alignment by the tension in its rib members. Further, the frame can be quickly disassembled when no longer needed or for transporting to a different location.

The frame can be covered within a transparent plastic film for use as a greenhouse or cold frame. The frame can be configured in the size most useful for the particular application. For example, a very small module with a few square feet of base area can be provided for use as a portable cold frame or a large module 7 or 8 feet high with 192 or more square feet of base area for use as a greenhouse with working space can be configured. Other materials may be used to cover the frame to make it suitable for other uses.

An alternative embodiment of the invention that may be advantageously used as a portable, storable shelter or as permanent shelter is illustrated in FIGS. 3 through 7. The skeletal frame structure is shown in FIG. 3, a typical covered frame is shown in FIG. 6, and the complete shelter disassembled for storage is shown in FIG. 7.

Turning to FIG. 3, a basic module 5 is illustrated and may be seen to be configured the same as the embodiment previously described with reference to FIG. 1. The basic difference is in the various element joints that advantageously utilize low-cost, readily available PVC elbows and tees. For example, end elements 31 and side elements 40 are joined at each corner of the base frame by right-angle elbows 34. End elements 31 are formed from a centrally located tee 32, two short tubular elements 33 and two right-angle elbows 34, as best seen in FIG. 7. In accordance with the invention, these parts are preferably cemented together to form a single, easily handled element. Ridge pole 45 is formed from tube 46 and right-angle elbows 38 cemented onto each end thereof. In this embodiment, ridge pole element 45, vertical supports 36, side member elements 40, and end member elements 31 may be formed from the same diameter PVC tubing while rib members 20 may be formed from a smaller diameter PVC tubing. A typical shelter may use 1 inch diameter tubing for the ribs and 2 inch diameter tubing for the other elements, and the base may be 12 feet by 16 feet with a 7 foot height.

Ridge pole 45 has lateral openings 48 for ribs 20 and openings 52 are provided through elbows 38 for end ribs 20'. The elbows 34 at the ends of end members 31 are provided with openings 54 through the upper sides thereof for the lower ends of ribs 20'. The frame is assembled as shown in FIG. 3. The tube-to-elbow and -tee connections are friction fit yet easily separated when desired. Ribs 20 are passed through the lateral openings 48 in the central portion of ridge pole 45, bent downward and the ends fitted in openings 42 in side members 40. End ribs 20' are passed through openings 52, bent downward and the ends inserted in openings 54 of elbows 34. The tension due to bending of ribs 20 and 20' create a force F which maintains the frame in a rigid configuration. FIGS. 4 and 5 show sections 4—4 and 5—5 respectively, illustrating the installation of ribs 20 through ridge pole 46 and into side member 40.

FIG. 6 shows a typical covering for a portable greenhouse with use of transparent plastic such as polyvinyl film. The cover may be economically fabricated by thermally welding the seams, and use of a zipper-type opening 52 at one end. A simple method of attaching the cover to frame 5 is illustrated in FIG. 6A. The lower edge of the plastic film 15 is shown wrapped around a typical tube member 40 and spring clips 60, which may be formed from plastic or the like, used to clamp the film 15.

FIG. 7 shows the shelter of FIG. 6 disassembled. Cover 15 may be rolled as shown and secured by straps 58. For storage of the portable shelter, it may be desirable to bundle the various elements and roll cover 15 to form a self-contained bundle similar to that illustrated.

The bundle is conveniently handled, stowed and transported.

Many applications of the instant invention may involve relatively permanent buildings; for example, for use as warehouse storage, garages, utility rooms, and similar structures. In assembly of the frame in accordance with the invention for such applications, all joints may be cemented, and solid materials may be used as a covering rather than the plastic film preferred for portable use.

Figure 8:
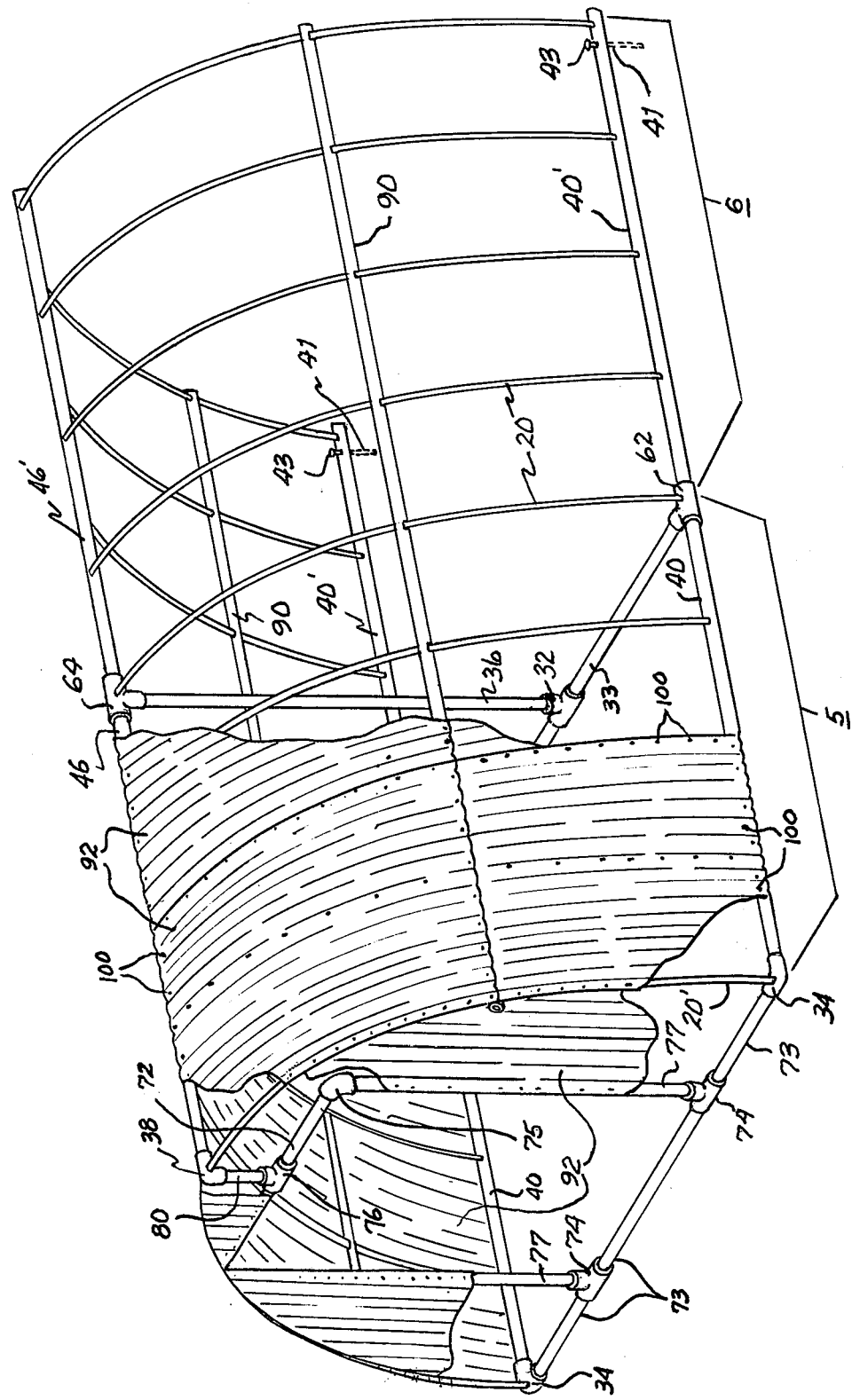
FIG. 8 is a cutaway perspective view of a multi-module configuration of the skeletal frame using corrugated fiberglass panels as a covering.

The skeletal frame shown in FIG. 8 is an extended version of the 5-rib module 5 shown in FIG. 3, with the elbows 34 and 38 at one end of the FIG. 3 module removed and replaced by tees 62 and 64 providing means for connecting another module thereto. FIG. 8 shows such a second module 6 connected to module 5. In module 6, base member 31 and vertical member 36 at the far end has been omitted, thereby providing an opening to allow a tractor, lawnmower, automobile or other vehicle into the structure. Due to the outward force created by ribs 20 in accordance with the invention, it is necessary in this configuration to anchor side members 40' to the ground. For example, a vertical opening 41 is shown through the outer end of module 6 side member 40' and stake 43 driven through opening 41.

The forward end of module 5 illustrates a simply fabricated doorway formed from tees 74 and 76, elbows 75 and vertical and horizontal members 77, 73, 78, 80, and 72. For applications requiring unrestricted space within the structure, the central vertical support member 36 may be omitted as well as the end frame members 32 and 33. In such case it is preferable to anchor the side members 40 with stakes as mentioned with regard to the far end side members 40'.

The arcuate frame may be covered with various readily available structural materials such as aluminum, corrugated steel or fiberglass. A preferred material that is lightweight, strong, translucent, and low-cost is fiberglass, available in both flat and corrugated panels of standard sizes. FIG. 8 illustrates typical corrugated fiberglass panels 92 in cutaway view applied and attached to the frame members by means of self-tapping screws 100. Panels 92 are shown covering ribs 20 in a vertical orientation, that is with the corrugations vertically aligned. For use with this orientation, ribs 20 are advantageously spaced to match the width of a panel 92, to permit attachment along the edges thereof. Adjacent panels are overlapped as is common practice for such panels. The panels may also, of course, be horizontally positioned.

To further facilitate attachment of standard size panels and to add rigidity to the structure when large modules are used, a longitudinal member 90 can be added at appropriate locations along ribs 20. For example, member 90 may be conveniently located along a horizontal line at which a horizontal panel joint is required thereby providing means for attaching the overlapping joints with self-tapping screws. Such joints are formed by arranging an upper panel to overlap the lower panel causing water on the upper panel to be delivered to the lower panel and carried by the corrugations to the ground. Longitudinal member 90 is preferably the same diameter as ridgepole 46 and provided with lateral openings 98 through which ribs 20 are passed.

As may be recognized, the length of ribs 20 and the spacing between side members 40 determine the height and width of the building and are selected in accordance with the desired application. While FIG. 8 illustrates two modules, it is apparent that the structure can be extended with additional modules as required. For structures of a permanent nature which will not require disassembly, it is advantageous to cement all joints with PVC cement achieving increased rigidity, especially for larger structures.

Another variation of the novel skeletal building frame that is within the scope of the invention involves a lean-to type structure that may be placed against an existing wall. A typical implementation of this version is fabricated by omitting members 33 and 45 on one side of the module 5 of FIG. 3, replacing tees 32 with elbows to connect vertical members 36 to members 33, and terminating ribs 20 and 20' after their passing through ridge pole 46. The resulting frame is seen to be a half-structure that may be placed against the wall of a house, garage or other wall structure to form a compact greenhouse, storage area, or the like.

The embodiments of the invention described hereinabove provide low-cost, light-weight shelter frames and shelters having excellent strength and rigidity that can be configured in many advantageous forms to suit a variety of applications. The structure uses easily available and handled materials, and can be quickly assembled by unskilled personnel with a minimum of tools and fasteners. It is to be understood that the embodiments described are for the purpose of illustrating the novel features of the invention and that variations in materials and configurations will be obvious to those skilled in the art. Such variations are considered to be within the spirit and scope of the invention.

The invention in which an exclusive property or privelege is claimed is as follows:

1. A skeletal frame for a greenhouse and the like comprising:
    a base formed from two side members and one or more connecting end members fixing said side members together;
    a ridgepole approximately equal in length to said sidemembers;
    a vertical member connected to said base and to said ridgepole; and
    a plurality of arcuate ribs formed from straight members bent to an arcuate shape, said arcuate ribs connected to said ridgepole at the apex of each arcuate rib and the ends of said arcuate ribs connected to said side members forming a set of parallel semicircular ribs spaced along said side members of said base;
    wherein the connections of all of the elements of said frame are formed by respective ends of said elements being inserted in and through openings in others of said elements and in which the integrity of said skeletal frame is maintained from tensions caused by such elastic bending of said arcuate ribs.

2. The skeletal frame as defined in claim 1 in which:
    said arcuate ribs are formed from first tubular members;
    said vertical member and said side members are formed from second tubular members larger in diameter than said first tubular members;
    said ridgepole and said end members are formed from third tubular members larger in diameter than said second tubular members; and
    said tubular members having circular openings therethrough for each connection required in the frame with the size of each said openings selected to receive its respective tubular member.

3. The skeletal frame as defined in claim 1 in which:
said arcuate rib members are formed from first tubular members;
said ridgepole, said vertical member, and said base members are formed from second tubular members having a larger diameter than said first tubular members;
connections of said second tubular members are formed by use of elbows and tees each having an internal diameter equal to the outside diameter of said second tubular members; and
connections of said first tubular members to said second tubular members are formed by inserting said first tubular members into and through circular openings in said second tubular members, said openings being equal in diameter the diameter of said first tubular members.

4. The skeletal frame as defined in claim 3 in which each of said tubular members, said elbows, and said tees are formed from polyvinyl chloride.

5. A skeletal frame for a greenhouse or the like that is quickly assembled and disassembled without fittings or tools comprising:
a generally rectangular base frame having a front member, a rear member, and two side members, said front member and said rear member each having a vertically disposed opening at each end and in the center thereof, and said side members each having a plurality of vertically disposed openings in a spaced relationship along its length;
a first vertical member installable in said central opening in said front member;
a second vertical member installable in said central opening in said rear member;
a ridgepole member having a downwardly disposed opening at each end, said member having a length approximately equal to the length of said side members and installable onto the top end of said certical members in a spanning relationship, said ridgepole member having a plurality of lateral openings therethrough, said openings having a spaced relationship essentially the same as said vertical openings in said side members; and
a plurality of flexible rib members, said rib members installable through said lateral openings in said ridgepole member with each end of said rib members insertable in one of said vertical openings in said side members in a manner to form a plurality of arcuate parallel ribs in a spaced relationship and under tension;
whereby the tension in the base resulting from elastic bending and inserting of said rib members into said side member's vertical openings maintains the shape and connections rigidly in position, and said vertical members resist vertical sagging of said frame and lateral movement of said ridgepole and said arcuate ribs.

6. The skeletal frame as defined in claim 5 in which all of the elements of said frame are formed from polyvinyl tubing.

7. A portable greenhouse that is assembled and disassembled without separate fittings or tools comprising:
an essentially rectangular base formed from two tubular end members and two tubular side members;
a tubular ridgepole approximately equal in length to the length of said base;
a first vertical tubular member connected to the center of first of said end members, and a second vertical tubular member connected to the center of second of said end member, and connected to and supporting the ends of said ridgepole; and
a plurality of arcuate ribs formed from straight tubular members bent to an arcuate shape, said ribs connected to said ridgepole at the apex of each arcuate rib, and the ends of said ribs connected to said side members forming a set of parallel vertical ribs spaced along said rectangular base, said arcuate ribs and said base thereby forming an arcuate skeletal frame;
each of said connections of said members formed by respective ends of said members being inserted in and through openings in others of said members whereby the integrity of said skeletal frame is maintained from forces in the frame caused by such elastic bending of said arcuate ribs;
a flexible plastic covering formed to fit over and cover said arcuate skeletal frame; and
clip means for temporarily attaching said covering to said skeletal frame.

8. The portable greenhouse as defined in claim 7 in which said tubular members are formed from polyvinyl tubing and said plastic covering is formed from vinyl sheet plastic.

* * * * *